(12) United States Patent
Choi et al.

(10) Patent No.: US 7,838,579 B2
(45) Date of Patent: Nov. 23, 2010

(54) SYNTHETIC STYRENE RESIN COMPOSITION FOR ENVIRONMENT-FRIENDLY WINDOW FRAME

(75) Inventors: Jang Hyun Choi, Daejeon (KR); Joo Yub Ho, Daejeon (KR); Seung Kyu Lee, Seoul (KR); Yun Hwan Kim, Seoul (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 83 days.

(21) Appl. No.: 11/914,197

(22) PCT Filed: May 12, 2006

(86) PCT No.: PCT/KR2006/001791

§ 371 (c)(1),
(2), (4) Date: Jul. 16, 2008

(87) PCT Pub. No.: WO2006/121309

PCT Pub. Date: Nov. 16, 2006

(65) Prior Publication Data

US 2009/0156717 A1    Jun. 18, 2009

(30) Foreign Application Priority Data

May 13, 2005    (KR) .................... 10-2005-0040026

(51) Int. Cl.
| | | |
|---|---|---|
| C08K 5/34 | (2006.01) | |
| C08K 5/3445 | (2006.01) | |
| C08L 7/00 | (2006.01) | |
| C08L 9/06 | (2006.01) | |
| C08L 9/02 | (2006.01) | |
| C08L 33/12 | (2006.01) | |

(52) U.S. Cl. ....................... 524/106; 524/156; 524/525; 524/221; 524/323; 524/414; 525/230; 525/525; 525/222; 525/191; 525/242

(58) Field of Classification Search ................. 524/323, 524/106, 156, 414; 525/242, 221, 222, 230
See application file for complete search history.

(56) References Cited

U.S. PATENT DOCUMENTS

| | | | |
|---|---|---|---|
| 6,583,189 B1 * | 6/2003 | King ........................... | 521/79 |
| 6,696,165 B1 * | 2/2004 | Bennett et al. ........... | 428/474.4 |
| 2005/0256273 A1 * | 11/2005 | Imai .......................... | 525/242 |

FOREIGN PATENT DOCUMENTS

| | | |
|---|---|---|
| JP | 2000-095910 | 4/2000 |
| KR | 1019960006004 B1 | 5/1996 |
| KR | 100134301 B1 | 12/1997 |
| KR | 100161504 B1 | 8/1998 |
| KR | 100200014 B1 | 3/1999 |

\* cited by examiner

*Primary Examiner*—Rabon Sergent
*Assistant Examiner*—Deve Valdez
(74) *Attorney, Agent, or Firm*—Steptoe & Johnson LLP

(57) ABSTRACT

Disclosed are a synthetic resin composition for use as building materials such as window frames, as well as a product manufactured using the same. More particularly, the synthetic resin composition comprises a tetrapolymer of acrylic rubber-styrene monomer-butadiene rubber-vinyl cyanide monomer and a styrene-vinyl cyanide copolymer having a high molecular weight and a high degree of dispersion. Unlike products manufactured using prior polyvinyl chloride (PVC), building material such as window frames manufactured using the synthetic resin composition are recyclable, and thus can contribute to a reduction in the generation of hormone-disrupting chemical dioxin, which is released in the burning thereof. Also, the resin composition can be manufactured into products having excellent properties of weather resistance and colorability without using environmental pollutants such as cadmium stearate or lead stearate, which are used as thermal stabilizers.

10 Claims, No Drawings

US 7,838,579 B2

SYNTHETIC STYRENE RESIN COMPOSITION FOR ENVIRONMENT-FRIENDLY WINDOW FRAME

CLAIM OF PRIORITY

This application claims priority under 35 USC 371 to International Application No. PCT/KR2006/001791, filed on May 12, 2006, which claims priority to Korean Patent Application No. 10-2005-0040026, filed on May 13, 2005, each of which is incorporated by reference in its entirety.

TECHNICAL FIELD

The present invention relates to a synthetic resin composition for use in building materials such as window frames, and more particularly to a synthetic resin composition comprising a tetrapolymer of an acrylic rubber-styrenic monomer-butadiene rubber-vinyl cyanide monomer, and a styrene-vinyl cyanide copolymer having a high molecular weight and a high degree of dispersion.

BACKGROUND ART

Polyvinyl chloride resin (PVC resin), which has been widely used for building materials such as window frames, has entailed a problem in that a large amount of environmentally harmful substances such as dioxins are generated during burning or extrusion processing. Also, heavy metal ions such as cadmium stearate (Cd-St) or lead stearate, which have been used as thermal stabilizers for the PVC resin, are regulated, because they act as human hormone-disrupting chemicals. Also, these ions have been identified as main factors causing problems such as sick building syndrome. Also, polyvinyl chloride resin has shortcomings in that, because it becomes discolored during the production thereof due to very poor thermal stability, it is difficult to recycle, and it has low weather resistance when used as an exterior building material, and is poor with respect to its ability to be colored with a pigment.

Attempts to improve such shortcomings in the PVC resin have been ongoing. For example, Korean Patent Registration No. 10-020014 made an effort to improve surface embossing during processing of the prior polyvinyl chloride resin, and Korean Patent Publication No. 2003-0057963 enhanced painting properties by adding fluoride resin in order to improve weather resistance. Also, Korean Patent Publication No. 2001-0096666 utilized a mixture of an ethylene copolymer and an ethylene terpolymer to prevent the production of environmentally harmful substance dioxin, but only substitutes for soft polyvinyl chloride resin.

Despite such efforts, the environmental problem caused by the PVC resin has still not been solved. For this reason, there has been a continued demand for an environment-friendly resin substitute for PVC, which does not generate environmentally harmful dioxin substances when burned and, at the same time, is prepared without using heavy metals such as the environmentally harmful substances lead or cadmium. Also, there has been a continued demand for a resin substitute for PVC, which does not cause the environmental problem caused by PVC resin, which can be processed (e.g., extruded and bonded) using existing PVC production equipment, and which has excellent properties of weather resistance and recyclability.

DISCLOSURE OF INVENTION

Technical Problem

An object of the present invention is to provide a novel thermoplastic composition for window frames.

Another object of the present invention is to provide a styrenic thermoplastic resin composition for window frames.

Still another object of the present invention is to provide a styrenic thermoplastic resin composition for window frames, which can be produced in PVC production facilities.

Yet another object of the present invention is to provide a method for preparing a styrenic thermoplastic composition for window frames.

A still further object of the present invention is to provide a window frame manufactured from a styrenic thermoplastic resin composition.

Technical Solution

To achieve the above objects, the present invention provides a styrenic thermoplastic resin composition for window frames, comprising: 5-40 wt % of a styrene-vinyl cyanide copolymer having a weight-average molecular weight of more than 150,000 and a ratio of weight-average molecular weight/number-average molecular weight of 2.5-5.5; and 60-95 wt % of a tetrapolymer of acrylic rubber-styrenic monomer-butadiene rubber-vinyl cyanide monomer, having a butadiene rubber content of less than 15 wt % based on the total weight of the rubber components.

In the present invention, the styrenic monomer is an aromatic vinyl monomer selected from among styrene, alpha-methylstyrene, p-methylstyrene, vinyltoluene and mixtures thereof, and is preferably styrene.

In the present invention, the vinyl cyanide monomer is selected from among acrylonitrile, methacrylonitrile and the like, and is preferably acrylonitrile.

In the present invention, the styrene-vinyl cyanide copolymer is a copolymer of a styrenic monomer and a vinyl cyanide monomer, and preferably a styrene-acrylonitrile copolymer.

In the present invention, the styrene-vinyl cyanide copolymer preferably has a wide molecular weight distribution, such that it can be extruded in a PVC resin extruder. More preferably, it has a ratio of weight-average molecular weight/number-average molecular weight of 2.5-5.5. When it has a wide molecular weight ratio such that the ratio of weight-average molecular weight/number-average molecular weight is 2.5-5.5, it can be extruded under the extrusion conditions of PVC resin, i.e., at relatively low temperatures, to produce a window frame, and can be extruded in a condition of conducting calibration using cooling water in order to maintain the shape of the window after extrusion, and also can be manufactured into moldings having an excellent surface state. Although not limited to any particular theory, when the distribution of molecular weight is wide, on the surface of molding, low-molecular-weight resin can be melted at low temperature so as to increase the smoothness of the resulting moldings, and high-molecular-weight resin can enhance the rigidity of the moldings, so that the final products can possess required durability. However, if the distribution of molecular weight is excessively wide, such that the ratio of weight-average molecular weight/number-average molecular weight is more than 5.5, a macropolymer, i.e., a polymer having a molecular weight of more than 1,000,000, can be formed in resin and will not be melted in extrusion processing, resulting in the formation of surface defects such as gel or fish-eyes on the surface of window frames, and a low-molecular-weight moiety will be volatilized in an extrusion process, resulting in a reduction in surface gloss.

In the present invention, the styrene-vinyl cyanide copolymer preferably has a weight-average molecular weight of more than 150,000, and more preferably 300,000-500,000, such that a final product can maintain physical properties, particularly rigidity.

In the practice of the present invention, the styrene-vinyl cyanide copolymer has a styrenic monomer content and vinyl cyanide monomer content of 60-80 wt % and 20-40 wt %, respectively. If the content of vinyl cyanide increases, the thermal stability of the polymer will be decreased, and if the content of the styrenic momoner increases, the rigidity of the product can be reduced.

In the present invention, the method for preparing the styrene-vinyl cyanide copolymer is not specifically limited as long as it can satisfy the above-described molecular weight and molecular weight distribution, and can be performed using conventional emulsion polymerization, bulk polymerization or suspension polymerization. In one embodiment of the present invention, the styrene-acrylonitrile copolymer can be prepared using emulsion polymerization or suspension polymerization.

The tetrapolymer of acrylic rubber-vinyl cyanide monomer-butadiene rubber-styrenic monomer according to the present invention is prepared using conventional emulsion polymerization. Specifically, it is prepared by copolymerizing an acrylic monomer with a butadiene monomer to make a rubbery polymer latex and then graft-polymerizing the polymer latex with vinyl cyanide monomer-styrenic monomer, and preferably acrylonitrile-styrene monomers.

In another embodiment of the present invention, the tetrapolymer of acrylic rubber-vinyl cyanide monomer-butadiene rubber-styrenic monomer can be prepared by separately polymerizing an acrylic monomer and a butadiene monomer to prepare an acrylic rubber latex and a butadiene rubber latex, blending the latexes with each other, and then graft-polymerizing the blend with vinyl cyanide monomer-styrenic monomer, preferably acrylonitrile-styrene monomer.

In the present invention, the acrylic monomer, which is used to prepare the rubbery polymer latex, is alkylacrylate, having 2-8 carbon atoms, and preferably butylacrylate or ethylhexylacrylate.

In the present invention, the butadiene monomer, which is used to prepare the rubber polymer latex, is a conjugated diene monomer selected from among butadiene, isoprene, chloroprene, butadiene-styrene, butadiene-methacrylate and the like.

In the present invention, regarding the ratio of the butadiene rubber to the acrylic rubber, the content of the butadiene rubber is 1-15 wt %, and preferably 3-10 wt %, based on the total weight of the rubber components, in order to maintain excellent properties of long-term weather resistance and recyclability.

To achieve the objects of the present invention, the inventive styrenic thermoplastic resin composition is preferably composed of 5-40 wt % of the styrene-vinyl cyanide copolymer and 60-95 wt % of the tetrapolymer of acrylic rubber-vinyl cyanide monomer-butadiene rubber-styrenic monomer. If the amount of styrene-vinyl cyanide copolymer is above the upper limit of the above-specified range, impact strength will be reduced, and if it is excessively low, processability will be reduced.

In a preferred embodiment of the present invention, the tetrapolymer of acrylic rubber-vinyl cyanide monomer-butadiene rubber-styrenic monomer is acrylic rubber-acrylonitrile-butadiene rubber-styrene (AABS). In one embodiment of the present invention, the tetrapolymer of acrylic rubber-acrylonitrile-butadiene rubber-styrene (AABS) has a ratio of acrylic rubber-butadiene rubber: acrylonitrile: styrene of 40-70 parts by weight: 5-20 parts by weight: 25-40 parts by weight.

In another aspect, the present invention provides a styrenic thermoplastic resin composition for window frames, comprising: 5-40 wt % of a styrene-vinyl cyanide copolymer having a weight-average molecular weight of more than 150,000 and a ratio of weight-average molecular weight/number-average molecular weight of 2.5-5.5; and 60-95 wt % of a tetrapolymer of acrylic rubber-styrenic monomer-butadiene rubber-vinyl cyanide monomer, having a butadiene rubber content of less than 15 wt % based on the total weight of the rubber components, the composition further comprising, based on 100 parts by weight of the composition, 0.01-1.0 parts by weight of an antioxidant, 0.01-1.0 parts by weight of a UV-absorbing agent, and 0.3-5.0 parts by weight of a lubricating agent.

In the styrenic thermoplastic resin composition for window frames according to the present invention, said antioxidant, UV-absorbing agent and lubricating agent are added to improve the thermal stability, UV stability and processability of the product. As the antioxidant, phenol, phosphorus or sulfuric ester can be used alone or in a mixture of two or more thereof, and is added in an amount of 0.01-1.0 parts by weight. As the UV-absorbing agent, benzotriazole or HALS may be used alone or in a mixture thereof and is added in an amount of 0.01-1.0 parts by weight. As the lubricating agent, ethylene bisstearamide, polyethylene wax or stearic acid is used and added in an amount of 0.3-5.0 parts by weight, and preferably 0.5-2.0 parts by weight.

The styrenic thermoplastic resin composition for window frames according to the present invention may contain a pigment for coloring. The pigment can be added after color matching according to the desired color. For the recycling of the product, the reduction in cost and the prevention of environmental pollution caused by the generation of waste resin, the styrenic thermoplastic resin composition for window frames according to the present invention can be used together with non-standardized products resulting from problems such as color variation and surface defects in a production process. Generally, the non-standardized products can be used in a mixture with the raw materials after crushing and are preferably recycled by adding them in an amount of less than 30 wt % based on the weight of the desired product.

The styrenic thermoplastic resin composition for window frames according to the present invention can be prepared in PVC extrusion conditions for window frames using PVC extrusion equipment for window frames. In the practice of the present invention, the styrenic thermoplastic resin for window frames can be generally extruded in an extruder temperature of 150-220° C., an PVC extrusion condition for window frames, using a raw material containing less than 30 wt % of scraps.

Advantageous Effects

The synthetic resin window frame materials made of the prior polyvinyl chloride resin have had problems in that, due to low thermal stability, they are difficult to recycle even when inferior products are generated in extrusion, and also, because products produced therefrom have high specific gravity, they can cause accidents affecting workers during transportation after production thereof. On the other hand, the window frame material according to the present invention does not generate dioxins when burned, and is cost-effective because it has no color variation or reduction in physical properties even when it contains more than 30 wt % of inferior products. Also, a product manufactured therefrom is easily handled, because it has a specific gravity at least 20% lower than that of the prior polyvinyl chloride resin. In addition, it does not impose an economic burden, because an existing PVC extruder may be used for the inventive material as it is. Also, it has excellent extrudability, because it does not surge during extrusion.

MODE FOR THE INVENTION

Hereinafter, the present invention will be described in further detail with reference to examples and comparative examples. However, these examples are not intended to limit the scope of the present invention.

Extrusion Conditions

Thermoplastic resins prepared as described below were manufactured into window frames using a window frame-manufacturing machine. As the window frame-manufacturing machine, a twin screw PVC extruder (95 mm; Sam Boo Machinery Co., Ltd.) was used, and the window frames were manufactured under the extruder conditions shown in Table 1 below. The manufactured window frame model was p-sash BF-115. Also, crushed materials (scraps) were used according to the following test conditions to extrude and manufacture window frames.

TABLE 1

| Die temperature | Temp. of cylinder 3 | Temperature of cylinder 2 | Temperature of cylinder 1 | Revolutions | Production (per hr) | Cooling water temperature | Load |
|---|---|---|---|---|---|---|---|
| 190° C. | 180° C. | 180° C. | 150° C. | 14 | 150 kg | 30° C. | 80-100 | extruder condition

Test Conditions

Comparison of Color Difference

The comparison of color difference was performed to examine thermal stability resulting from the use of the crushed materials.

Comparison of Physical Properties

Samples collected from the manufactured window frames were tested for tensile strength, impact strength (Izod impact strengths at low temperature (−20° C.) and room temperature), specific gravity, surface gloss and the like.

Comparison of Thermal Stability

The comparison of thermal stability was performed by measuring color difference before and after aging in a gear oven at 180° C. for 50 minutes.

Weather Resistance Test

Accelerated weather resistance testing (water spraying) was carried out in a weather-o-meter equipped with a zenon-arc lamp at 63° C. for 1200 hours, and color difference before and after the testing was then measured.

Surging or Extrudability Evaluation

The evaluation of surging upon extrusion when making window frames was performed by determining whether or not a surging phenomenon (thickness change: target value more than 10% and change in extruder load more than 10%) occurred during one-hour extrusion after the extrusion had stabilized.

EXAMPLE 1

SAN copolymer resin was prepared by subjecting monomers to a general emulsion polymerization process using an initiator, an emulsifying agent and water. Herein, to control the weight-average molecular weight and molecular weight of the resin to values required in the present invention, the content of tert-dodecylmercaptan was controlled. Gel permeation chromatography (GPC) was conducted to analyze the weight-average molecular weight (Mw) and weight-average molecular weight (Mw)/number-average molecular weight (Mn) of the resin.

To prepare a tetrapolymer (AABS), a rubbery polymer was first prepared by subjecting a butyl acrylate monomer and a butadiene monomer to emulsion polymerization using a conventional catalyst, an emulsifying agent, a crosslinking agent and the like. To the prepared rubbery polymer, a catalyst and the like were added and the temperature of the polymer was elevated. Then, a mixture of an acrylonitrile monomer and a styrene monomer was added thereto together with an emulsifying agent solution with stirring, followed by aging at high temperature to remove the remaining unreacted monomers, thus obtaining the tetrapolymer (AABS).

The prepared SAN copolymer and tetrapolymer were coagulated by the addition of magnesium sulfate as an electrolyte, washed with water, and then dried, to thereby prepare particles.

1. Preparation of SAN Copolymer 100 parts by weight of ion-exchanged water was fed into a polymerization reactor and heated to 74° C. Then, 0.2 parts by weight of potassium persulfate ($K_2S_2O_8$) as an initiator was dissolved in 10 parts by weight of ion-exchanged water and completely fed into the polymerization reactor.

75 parts by weight of a styrene monomer, 25 parts by weight of an acrylonitrile monomer and 0.150 parts by weight of tertiary dodecylmercaptan were mixed with each other, and 5 wt % of the monomer mixture was initially fed into the reactor. At this time, 1.5 parts by weight of potassium rosinate as an emulsifying agent was dissolved in 30 parts by weight of ion-exchanged water, and 15 wt % of the solution wad fed into the reactor together with the initial monomer mixture.

After 30 minutes, the remaining portions of the monomer mixture and the emulsifying agent solution were continuously fed into the reactor while maintaining a temperature of 74° C. Then, the reaction material was heated to 77° C. and aged for 2 hours at that temperature, thus obtaining an SAN copolymer.

2. Preparation of Rubbery Polymer (Tetrapolymer)

Step 1

100 parts by weight of ion-exchanged water was fed into a polymerization reactor and heated to 70° C. When that temperature was reached, ferrous sulfate, sodium formaldehyde sulfoxylate and ethylenediamine tetraacetate catalysts were fed into the reactor in amounts of 0.002 parts by weight, 0.3 parts by weight and 0.01 parts by weight, respectively.

Step 2

90 parts by weight of butylacrylate, 10 parts by weight of butadiene and 0.5 parts by weight of divinylbenzene were mixed with each other and slowly fed into the reactor over 3 hours. At the same time, 0.7 parts by weight of potassium rosinate and 0.05 parts by weight of cumene hydroperoxide were dissolved in 30 parts by weight of ion-exchanged water and slowly fed into the reactor over 3 hours.

Step 3

Based on 60 parts by weight of the rubbery polymer prepared in said step 2, 30 parts by weight of styrene was mixed with 10 parts by weight of acrylonitrile and slowly fed into the reactor over 3 hours. At the same time, 1.2 parts by weight of potassium rosinate and 0.06 parts by weight of cumene hydroperoxide were dissolved in 30 parts by weight of ion-exchanged water and slowly fed into the reactor over 3 hours.

To each of the rubbery latex thus prepared and the SAN copolymer latex, about 2-3-fold amount of ion-exchanged water was added, and the polymer solutions were heated to a temperature of 80-95° C. and coagulated by the addition of a coagulating agent. Then, the coagulated polymers were washed with water, dried, blended with each other, extruded and injected, thus obtaining a specimen. The obtained specimen was measured for Izod impact strength and melt index, and the measurement results are shown in Table 2 and Table 3 below.

The mixing ratio between the SAN copolymer resin and the AABS resin was adjusted as shown in Table below. To the resin mixture, 0.5 parts by weight of antioxidant phenol (KUMANOX 5010; Kumho Petrochemical Co., Ltd.), 0.5 parts by weight of UV-absorbing agent benzotriazole (Ciba Special TI-327), 1.0 part by weight of lubricating agent polyethylene wax (mp 220; Mitsubishi Chemical Corp., Japan) and 6.0 parts by weight of white pigment titanium dioxide (trade name: 831) were added. The resulting mixture was extruded under the above-described extrusion conditions, to thereby manufacture a window frame.

EXAMPLE 2

The process of Example 1 was repeated, except that the preparation of the SAN copolymer was conducted using a monomer mixture of 75 parts by weight of a styrene monomer, 25 parts by weight of an acrylonitrile monomer and 0.08 parts by weight of tertiary dodecylmercaptan.

EXAMPLE 3

The process of Example 1 was repeated, except that the preparation of the SAN copolymer was conducted using a monomer mixture of 75 parts by weight of a styrene monomer, 25 parts by weight of an acrylonitrile monomer and 0.01 parts by weight of tertiary dodecylmercaptan, and 100 wt % of each of the monomer mixture and the emulsifying agent solution were continuously fed without initial feeding.

EXAMPLE 4

The process of Example 3 was repeated, except that the AABS tetrapolymer was prepared using a rubbery polymer of 95 parts by weight of a butylacrylate monomer and 5 parts by weight of a butadiene rubber, and an SAN copolymer having a weight-average molecular weight of 450,000 and a molecular weight distribution of 4.3 was used.

EXAMPLE 5

According to an emulsion polymerization process, an initiator, an emulsifying agent and pure water as a dispersion medium were first fed into a polymerization reactor and heated to 70° C., and then a butylacrylate monomer and a crosslinking agent were continuously added with stirring, thus preparing a partially crosslinked acrylic rubber latex. 60 parts by weight (expressed on a solid basis) of 30 parts by weight of styrene, 10 parts by weight of acrylonitrile together with a conventional emulsifying agent, initiator and the like were continuously added, thus preparing a copolymer (A) latex comprising the styrene-acrylonitrile grafted to the acrylic rubber. Meanwhile, 60 parts by weight (expressed on a solid basis) of polybutadiene latex was first fed into a polymerization reactor and heated to 70° C. with stirring. Then, an emulsifying agent, an initiator, 30 parts by weight of a styrene monomer and 10 parts by weight of acrylonitrile were continuously added thereto and subjected to polymerization, thus preparing a copolymer (B) latex comprising the styrene-acrylonitrile grafted to the butadiene rubber. Using magnesium sulfate as an electrolyte, 85 parts by weight (expressed on a solid basis) of the copolymer (A) and 15 parts by weight (expressed on a solid basis) of the copolymer (B) were blended with each other and coagulated, thus preparing a tetrapolymer (C). Also, as shown in Table below, an SAN copolymer having a weight-average molecular weight of 250,000 and a weight-average molecular weight/number-average molecular weight (Mw/Mn) of 5.2 was used, and the same antioxidant, lubricant, UV-absorbing agent and the like as in other Examples were used.

EXAMPLE 6

The resin prepared in Example 1 was manufactured into a window frame using an extruder, and then crushed. The crushed material was added to the virgin resin in an amount of 30 parts by weight and used to manufacture a window frame.

COMPARATIVE EXAMPLE 1

The process of Example 1 was repeated, except that the AABS tetrapolymer was prepared using a rubbery polymer consisting of 100 parts by weight of a butylacrylate monomer without a butadiene monomer, and an SAN copolymer having a weight-average molecular weight of 310,000 and a molecular weight distribution of 3.8 was used.

COMPARATIVE EXAMPLE 2

The process of Comparative Example 1 was repeated, except that an SAN copolymer having a weight-average molecular weight of 170,000 and a molecular weight distribution of 3.8 was used.

COMPARATIVE EXAMPLE 3

To 100 parts by weight of a polyvinyl chloride resin polymer (degree of polymerization: 1000; trade name: p-1000), 6.5 parts by weight of an acrylic impact modifier (trade name: IM-808), 0.5 parts by weight of lead stearate as a primary thermal stabilizer and 0.5 parts by weight of a Cd—Ba organic complex (trade name: SMS-ZPSX) were added and the mixture was stirred at 80° C. at a high speed for 7-8 minutes. Then, 3.5 parts by weight of calcium carbonate as a filler, 3.5 parts by weight of calcium carbonate ($TiO_2$) as a pigment and 0.5 parts by weight of polyethylene wax (PE-520) as a lubricating agent were added thereto and the mixture was stirred and extruded using a PVC extruder, to thereby manufacture a window frame.

COMPARATIVE EXAMPLES 4 and 5

The window frame manufactured in Comparative Example 3 was crushed into chips and added in amounts of 10 parts by weight and 20 parts by weight. The mixtures were extruded to manufacture window frames.

TABLE 2

|  |  | Example 1 | Example 2 | Example 3 | Example 4 | Example 5 | Comp. Example 1 | Comp. Example 2 |
|---|---|---|---|---|---|---|---|---|
| SAN resin | Mn/Mw | 3.5 | 3.5 | 4.3 | 4.3 | 5.2 | 3.8 | 2.1 |
|  | Mw | 230,000 | 350,000 | 450,000 | 450,000 | 250,000 | 310,000 | 170,000 |
|  | AN/SM | 25/75 | 25/75 | 25/75 | 25/75 | 25/75 | 25/75 | 25/75 |
| AABS/(AABS + SAN) |  | 50 | 50 | 50 | 40 | 50 | 30 | 10 |
| Content of butadiene rubber in rubber components |  | 10 | 10 | 10 | 5 | 15 | 0 | 20 |
| Color difference ($\Delta$E) |  | 0.4 | 0.4 | 0.4 | 0.5 | 0.5 | 0.3 | 0.9 |
| Thermal stability (yellow index) |  | 4.5 | 5.2 | 5.1 | 4.5 | 5.3 | 3.9 | 7.2 |
| Weather resistance ($\Delta$E) |  | 0.9 | 1.1 | 0.7 | 1.2 | 1.4 | 1.3 | 1.7 |
| Impact resistance (23° C.) |  | 69 | 75 | 76 | 61 | 67 | 61 | 40 |
| Low-temperature impact resistance (−20° C.) |  | 10 | 12 | 14 | 9 | 13 | 2 | 18 |
| Tensile strength |  | 420 | 430 | 410 | 440 | 440 | 440 | 390 |
| Heat distortion temperature |  | 83 | 84 | 86 | 89 | 85 | 89 | 85 |
| Surface glass |  | 91 | 91 | 90 | 93 | 93 | 80 | 92 |
| Specific gravity |  | 1.07 | 1.07 | 1.06 | 1.05 | 1.01 | 1.08 | 1.07 |
| Surging phenomenon in extrusion |  | No | No | No | No | No | No | Occurred |

TABLE 3

|  | Comparative Example 3 | Comparative Example 4 | Comparative Example 5 | Comparative Example 6 |
|---|---|---|---|---|
| Used resin | PVC | PVC | PVC | AABS |
| Content of crushed material (scrap) | 0 part by weight | 10 parts by weight | 20 parts by weight | 30 parts by weight |
| Color difference ($\Delta$E) | 0.5 | 3.4 | 4.2 | 0.6 |
| Thermal stability (yellow index) | 12.9 | 30.4 | 50.5 | 5.9 |
| Weather resistance ($\Delta$E) | 1.9 | 2.5 | 3.2 | 0.8 |
| Impact resistance (room temperature) | 60 | 41 | 35 | 62 |
| Low-temperature impact resistance (−20° C.) | 7 | 3 | 2 | 14 |
| Tensile strength | 440 | 430 | 430 | 440 |
| Heat distortion temperature | 70 | 72 | 72 | 86 |
| Surface gloss (60°) | 82 | 84 | 86 | 90 |
| Specific gravity | 1.43 | 1.42 | 1.41 | 1.08 |
| Extrudability (surging) | No | Occurred | Occurred | No |

The invention claimed is:

1. A styrenic thermoplastic resin composition for window frames, comprising: 5-40 wt % of a styrene-vinyl cyanide copolymer having a weight-average molecular weight of more than 150,000 and a ratio of weight-average molecular weight/number-average molecular weight of 2.5-5.5; and 60-95 wt % of a tetrapolymer of acrylic rubber-vinyl cyanide monomer-butadiene rubber-styrenic monomer, having a butadiene rubber content of less than 15 wt % based on the total weight of the rubber components.

2. The styrenic thermoplastic resin composition of claim 1, which additionally comprises, based on 100 parts by weight of the composition, 0.01-1.0 parts by weight of an antioxidant, 0.01-1.0 parts by weight of a UV-absorbing agent and 0.3-5.0 parts by weight of a lubricating agent.

3. The styrenic thermoplastic resin composition of claim 2, wherein the antioxidant is selected from the group consisting of phenol, phosphorus, sulfuric ester and mixtures of two or more thereof.

4. The styrenic thermoplastic resin composition of claim 2, wherein the UV-absorbing agent is selected from the group consisting of benzotriazole, HALS and a mixture thereof.

5. The styrenic thermoplastic resin composition of claim 1, wherein the tetrapolymer is prepared by polymerizing an acrylic monomer with a butadiene monomer to make a rubbery polymer latex and graft-polymerizing acrylonitrile and styrene monomers onto the polymer latex.

6. The styrenic thermoplastic resin composition of claim 5, wherein the acrylic monomer contains 2-8 carbon atoms.

7. The styrenic thermoplastic composition of claim 1, wherein the tetrapolymer of acrylic rubber-styrenic monomer-butadiene rubber-vinyl cyanide monomer is an acrylic rubber-acrylonitrile-butadiene-styrene (AABS).

8. A method of manufacturing a window frame, consisting of extruding the resin composition of claim 1 or 2 at a temperature of 150-220° C.

9. The method of claim 8, wherein the window frame comprises scrap of the extruded resin composition in an amount of less than 30 wt %.

10. A window frame manufactured by extruding the resin composition of claim 1 or 2.

* * * * *